C. T. FLETCHER.
FRICTION CLUTCH.
APPLICATION FILED AUG. 17, 1908.

994,141.

Patented June 6, 1911.
2 SHEETS—SHEET 1.

WITNESSES:
Rob R Kitchel
Frank O French

INVENTOR
Charles T Fletcher
BY
Augustus B Stoughton
ATTORNEY.

C. T. FLETCHER.
FRICTION CLUTCH.
APPLICATION FILED AUG. 17, 1908.

UNITED STATES PATENT OFFICE.

CHARLES T. FLETCHER, OF PHILADELPHIA, PENNSYLVANIA, ASSIGNOR, BY MESNE ASSIGNMENTS, TO FRANK E. FRENCH, OF PHILADELPHIA, PENNSYLVANIA.

FRICTION-CLUTCH.

994,141. Specification of Letters Patent. Patented June 6, 1911.

Application filed August 17, 1908. Serial No. 448,981.

*To all whom it may concern:*

Be it known that I, CHARLES T. FLETCHER, a citizen of the United States, residing at the city of Philadelphia, in the county of Philadelphia and State of Pennsylvania, have invented certain new and useful Improvements in Friction-Clutches, of which the following is a specification.

The principal object of the present invention is to provide a friction clutch which shall be simple, reliable and durable and which shall be well adapted to meet the requirements of automobiles and which shall be capable of easy adjustment and repair.

Figure 1:
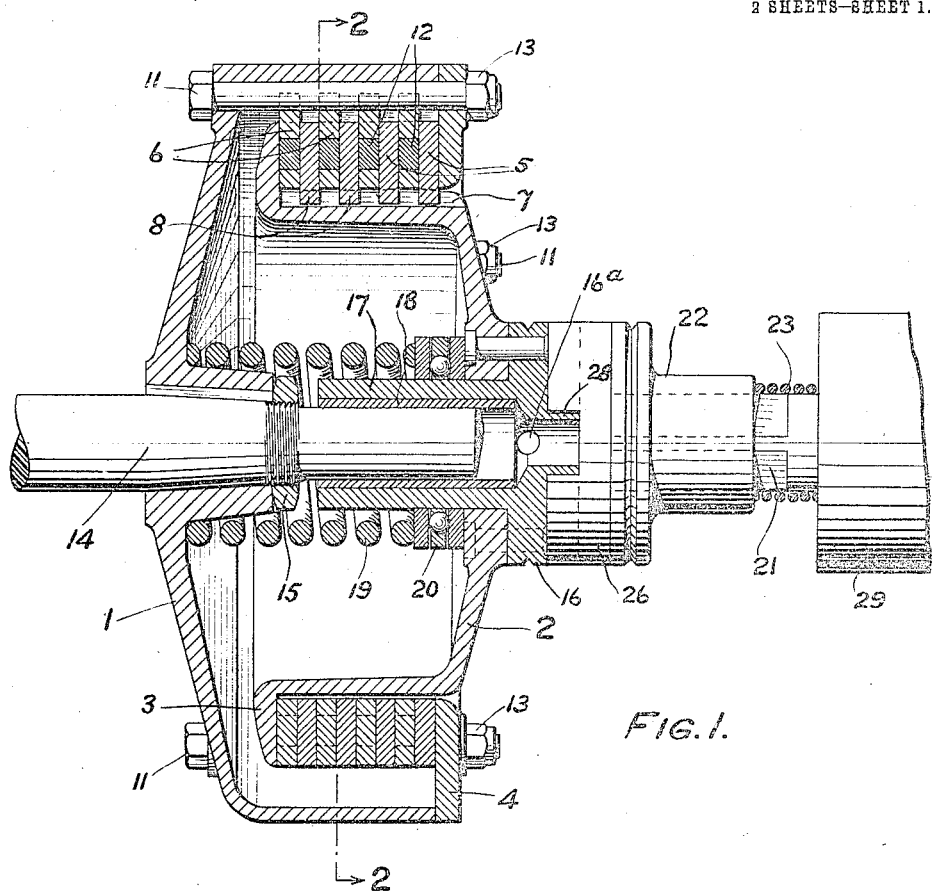
Figure 3:
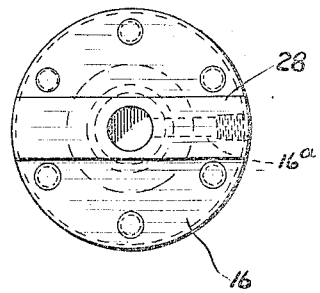
Figure 2:
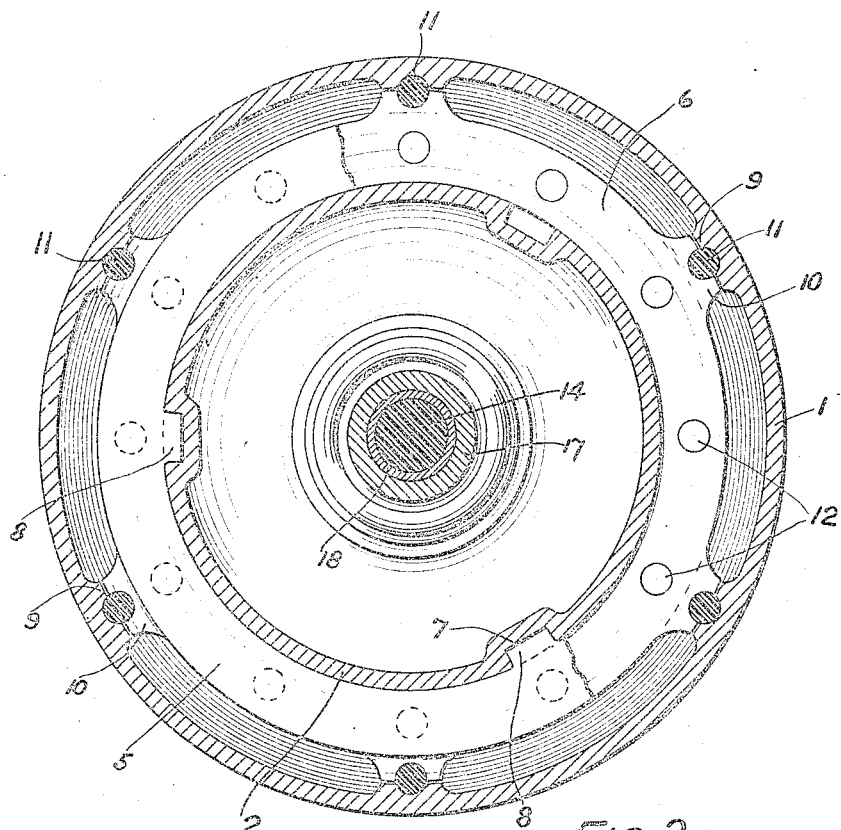
Figure 4:
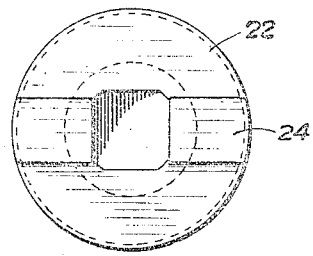
Figure 5:
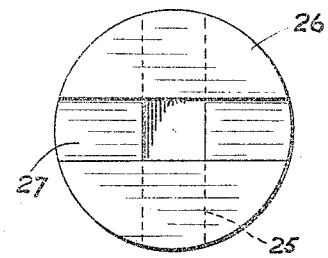

In the drawings Figure 1, is a side elevational view, partly in section, of a clutch embodying features of the invention. Fig. 2, is a transverse sectional view taken on the line 2—2, of Fig. 1. Fig. 3, is an end view looking toward the left of the coupling member that is attached to the clutch. Fig. 4, is an end view of the clutch shaft coupling flange, and Fig. 5, is an end view of the clutch coupling member.

1 and 2, are the parts, members or elements of the clutch. They are cylindrical and hollow and arranged one within the other, and the inner one is provided with an outward flange 3, and the outer one is provided with an inward flange 4. The flange 4, is detachable to facilitate the assembly of the parts. Interposed between the flanges 3 and 4, are a series of rings 5 and 6, each of which is freely movable crosswise of the clutch, and the alternate rings in the series are respectively connected with the clutch members 1 and 2. There are between the rings 5, and the clutch member 2, axial grooves 7, and projections 8, which constitute means for causing the rings 5, to turn with the clutch member 2, and for permitting the rings 5, to move axially of the member 2. As shown the grooves 7, are formed on the outside of the clutch member 2, which is shown as internally reinforced to provide for the formation of the grooves, and the ribs or projections 8, are formed on the inner rim of the rings 5. The rings 6, are connected so as to turn with but be movable axially in respect to the member 1, by means of what may be called slot-and-pin connections. As shown the member 1, is internally provided with countersunk projections 9, and the rings 6, are provided with countersunk projections 10. The countersunk portions of the member 1, and rings 6, constitute ways which receive the shanks of the bolts 11, that serve to attach the flange 4, to the member 1. These bolts 11, also serve to connect the rings 6, and the member 1, in such way that they rotate as one while the rings are axially movable.

12, are inserts of cork or the like which are useful in the provision of the proper frictional contact or resistance or engagement of the rings.

By removing the nuts 13, it is easy to obtain access to all the rings and parts and also to take apart or assemble the same.

The member 1, is shown as keyed to the shaft 14, and held to place against endwise movement on a conical part thereof by means of a nut 15, engaging its hub. Riveted or otherwise secured to the member 2, is a clutch drum coupling flange 16, provided with a sleeve 17, containing a bushing 18, that encircles and runs on the end of the shaft 14, the diameter of which is shown as reduced.

16ª, is an oil hole or duct arranged through the part 16.

Interposed between the part 16, and the member 1, is a spring 19, and an end thrust bearing 20, which coöperates with it in tending to push the members 1 and 2, apart and in permitting of the rotation of the member 2. The normal operation of the spring is to push the members 1 and 2, apart and thus to push the confronting flanges 3 and 4, toward each other, with the result that all of the rings are pressed together so that the members 1 and 2, turn as one. When the spring 19, is compressed, for example, by shifting the clutch drum coupling flange toward the left, the pressure upon the rings is diminished and they slip in respect to each other so that one member of the clutch may move while the other may remain at rest or move at a slower rate of speed.

21, is a squared shaft upon which is mounted a clutch shaft coupling flange 22, that turns with the shaft and may move endwise thereof.

23, is a spring tending to push the part 22, toward the left.

The part 22, is provided with a diametrically arranged projection 24, shown as of rectangular cross-section and cut away at the middle to accommodate the shaft 21. The projection 24, slidably fits a groove 25, on one face (the back face as shown in Fig. 5) of the clutch coupling block 26, which may be made of bearing metal. A groove 27, across the face of this block receives a projection 28, across the end face of the clutch drum coupling flange 16.

The purpose of the various parts last described is to accommodate any irregularities that may occur in the alinement of the shafts 21 and 14.

29, is a part upon which the spring 23, bears and it may be a collar hub or other piece.

What I claim is:

1. A friction clutch comprising an inner drum having an outward end flange, rings mounted on said drum, a rib-and-slot connection between the rings and drum whereby they turn as one and permit axial movement of the rings, an outer drum, a detachable end flange for the outer drum, bolts connecting the end flange and the outer drum, and a second set of rings alternating with the first set of rings and peripherally notched to slidably engage the shanks of the bolts, substantially as described.

2. A friction clutch comprising an outer drum having a detachable end flange, an inner drum having an end flange, friction rings interposed between said flanges and whereof the intermediate rings have sliding connection with the inner drum and the alternate rings have sliding connection with the outer drum, means comprising a spring and an end thrust anti-frictional bearing interposed between the hubs of the drums, a clutch drum coupling flange connected with the hub of the inner drum, a clutch coupling block having projection and groove connection with the clutch drum coupling flange, and a clutch shaft coupling flange having projection and groove connection with the clutch coupling block and being internally squared, substantially as described.

3. A friction clutch comprising a clutch drum coupling flange provided with a bushing and with an oil inlet, an inner drum carried by said coupling flange and provided with a flanged end and upon its curved surface with axial grooves, an outer drum provided with a detachable end flange and with bolts for securing the same, rings of which some are provided with projections that work in the grooves of the inner drum and others are provided with projections that work on the shanks of said bolts, and a spring and thrust bearing interposed between said drums, substantially as described.

4. In a friction clutch the combination of an inner drum provided with an outward end flange and on its cylindrical surface with axial grooves, rings mounted on the inner drum and provided with inward projections that work in said grooves, an outer drum provided with a detachable inward end flange and on the inner surface with axially arranged concave seats, bolts having their shanks arranged in said seats and adapted to hold said detachable flange, and rings alternating with the first mentioned rings and having notched peripheries adapted to engage the shanks of said bolts, substantially as described.

5. In a friction clutch the combination of an end flange, an outer drum having upon its inner curved surface axially arranged concave seats, bolts having their shanks arranged in the seats and adapted to hold the end flange, and rings mounted in said drum and peripherally notched for engagement with the shanks of the bolts, substantially as described.

6. Friction clutch mechanism comprising the combination of a shaft, a drum having its hub secured to the body of said shaft to permit the end thereof to project, a second drum nested in respect to the first and having a sleeve revoluble on the projecting end of said shaft and provided with a laterally projecting clutch drum coupling flange, a spring encircling said shaft and tending to separate the drums, friction rings between said drums, a squared shaft having a spring actuated clutch shaft coupling that turns with and is movable endwise of it, a clutch coupling block, and groove-and-projection connections between the block and the coupling flange and the block and the shaft coupling, whereby irregularities in alinement of the shafts is compensated for.

In testimony whereof I have hereunto signed my name.

CHARLES T. FLETCHER.

Witnesses:
AUGUSTUS B. STOUGHTON,
FRANK E. FRENCH.